Patented June 12, 1951

2,557,053

UNITED STATES PATENT OFFICE 2,557,053

METHOD OF TESTING PECTIC SUBSTANCES

Herbert T. Leo and Clarence C. Taylor, Anaheim, Calif.

No Drawing. Application November 28, 1945, Serial No. 631,487

2 Claims. (Cl. 195—30)

This invention relates to a method for testing that type of pectic substances disclosed and claimed in our copending application Serial No. 616,654, filed September 15, 1945, entitled "Novel Type of Pectic Substance and Method of Preparing the Same." Reference is made to this copending application for features and steps not disclosed or discussed in the present application.

In said copending application we have disclosed and claimed a novel type of pectic substance designated as "pectinic acid" and characterized, inter alia, by susceptibility to precipitation or insolubilization by calcium or other alkaline earth compounds, magnesium compounds or heavy metal compounds such as iron, nickel or copper compounds. Pectinic acid may be prepared by the action of pectase on an aqueous dispersion of pectin having a pH of at least 5.3 maintained by the addition to said dispersion of neutralizing compounds selected from the group consisting of alkaline earth metal salts and magnesium compounds. Calcium carbonate is the preferred neutralizing agent.

As a result of the action of pectase on pectin, the pectin is transformed into pectinic acids that form with the calcium present in the dispersion a jelly containing practically all of the pectic substances present in or derived from the original dispersion. To render the pectinic acid dispersible in various aqueous media and thus available for the preparation of jellies, all or part of the calcium or the like initially incorporated with the starting material and still present in the final insoluble product may be removed from the final product of the pectase action at or after the time the pectase action has been terminated. Most suitably, termination of the pectase action (destruction of the enzyme) and removal of calcium are effected as a single step by washing the jelly with acidified aqueous alcohol.

Contrary to the understanding of prior art workers that the action of pectase on pectin yields pectic acid in one step, we have found that under the conditions described hereinabove the action of pectase yields pectinic acids of progressively increased susceptibility to precipitation by calcium or other alkaline earth metal, magnesium, iron, copper or other heavy metal compounds. However, the action of pectase stops short of the formation of pectic acid. In other words, during the action of pectase on pectin, progressive changes are effected in the pectin so that, depending on when the pectase action is terminated, pectinic acids having various and different characteristics may be prepared. Of these characteristics, the calcium susceptibility is of particular importance, as disclosed in said copending application. Further, the calcium susceptibility largely controls the jellying behavior of a pectinic acid, so that a pectinic acid is fairly well characterized in terms of its calcium susceptibility.

It should be understood that pectinic acids having the same calcium susceptibility and other characteristics can be prepared by pectase treatments extending over different periods of time due to different conditions of pectin or pectase concentration, temperature, pH or other factors influencing the rate of pectase action. In general, higher temperatures, higher pectase concentration and, to some extent, higher pH values, accelerate the pectase action and lead in shorter time to the formation of pectinic acids more susceptible to precipitation by calcium. It is therefore evident that merely terminating the pectase action within a predetermined period of time does not necessarily yield a pectinic acid having predetermined desired characteristics.

Without entering into a discussion of what "calcium susceptibility" actually is, and how this characteristic may be determined, we can state that when it is desired to prepare a pectinic acid having any desired calcium susceptibility, such preparation, at least theoretically, can be effected by running pilot batches under different conditions and for different lengths of time until a pectinic acid has been obtained having the desired calcium susceptibility, and then duplicating the conditions under which the desired calcium susceptibility was effected. However, it is not easy, for instance, to duplicate temperature of pectase action throughout the year.

While the extent of pectase action, at least theoretically, can thus be predetermined under the conditions of pectin and pectase concentrations, pH, temperature and like factors affecting the rate of pectase action that obtain when plant batches are being run, and while the length of pectase treatment in the plant can be regulated accordingly, yet it would be much more desirable to be able to follow and control the pectase action by a simple test that indicates the progress of said action quickly and accurately while a plant batch is being processed.

We have therefore invented a method for carrying out determinations of calcium susceptibility conveniently and rapidly for control purposes while pectase action actually is progressing in a plant batch. While the firmness of the calcium jelly formed by pectase does not offer a reliable index to the progress of the pectase action, we have found that such an index is provided by another characteristic of the pectinic acid, viz., the variations in solubility of combinations with calcium of said pectinic acid that occur as pectase action progresses. We have further found that variations in calcium susceptibility with progressive pectase action can conveniently and rapidly be determined, while the pectase action progresses, by determining either the pH at which said calcium jelly will redissolve or by determining, after dissolution of said calcium jelly, the minimum pH at which a calcium jelly will be reformed.

It is therefore an important object of the present invention to provide a method for rapidly and conveniently determining the calcium susceptibility of the pectinic acid.

Another important object of the present invention is to provide a method for following variations in calcium susceptibility when pectinic acids are being prepared from pectin by the action of pectase in the presence of a calcium compound.

A further object of the present invention is to provide a method for determining quickly the calcium susceptibility of a pectinic acid by a determination of the minimum pH required for dissolving said pectinic acid in the presence of a calcium compound.

Other and further objects and features of the present invention will become apparent to those skilled in the art from the following description and appended claims.

Broadly speaking, the methods of the present invention include a determination of the solubility behavior at various pH values of a given pectinic acid in the presence of a calcium compound.

A specific method according to the present invention involves a determination of the pH value of redissolution of a calcium jelly formed during the course of the action of pectase on pectin in the presence of calcium carbonate or the like. The pH of redissolution of the calcium jelly may conveniently be determined by taking small samples of the jelly from a pectinic acid batch being regulated and breaking up the jelly samples. To the disintegrated calcium-pectinic acid jelly we add gradually increasing amounts of acid until solution of the jelly particles becomes evident. For acidifying, we find it convenient to use an acid solution made up of 50 cc. 80% U. S. P. lactic acid, 50 cc. 37% chemically pure hydrochloric acid and 400 cc. distilled water. This combination of acids has been found convenient because both the acids form water soluble calcium salts, and further, the pH values may be more easily controlled by such a combination of a relatively weak and a relatively strong acid.

Disintegration of the calcium pectin jelly may be effected, if desired, by grinding the jelly in a glass mortar or by forcing the jelly through a fairly fine screen. The hydrochloric-lactic acid mixture is added gradually until solution takes place. Care must be taken not to lower the pH value too rapidly, in order to insure that the minimum required pH value for dissolution will not be passed over. The appearance of the liquid will indicate when solution is taking place and at that time (when enough acid has been added to effect solution of the calcium-pectinic jelly), the pH value of the mixture is determined. The pH value thus obtained is the definite measure of the extent of the pectase action and corresponds to a pectinic acid having a definite combination of calcium susceptibility with jellying and other characteristics that can be easily ascertained by immediately terminating the pectase action, isolating the resulting pectinic acid and determining its jellying and other characteristics.

An example of the gradual lowering (with progression of pectase action) of the minimum pH value required for dissolution of the calcium-pectinic acid jellies is given hereinbelow. In this instance, a more dilute pectase extract was used than in the specific examples described hereinbelow, and 12 (instead of 3) hours were required to reach the same final product. The minimum pH values required for dissolution of the calcium-pectin jellies at various times are tabulated as follows:

| Time of Treatment | pH Required for Dissolution of Jellies |
|---|---|
| 0 | 6.0 |
| 1 | 4.4 |
| 2 | 3.1 |
| 3 | 2.4 |
| 4 | 2.1 |
| 5 | 1.9 |
| 6 | 1.6 |
| 7 | 1.5 |
| 8 | 1.4 |
| 9 | 1.3 |
| 10 | 1.2 |
| 11 | 1.1 |
| 12 | 1.0 |

In the earlier stages of the treatment with pectase solution took place quite readily on testing with acid. As the pectase action progressed toward the 8-hour period, solution took place more slowly, and finally, at about 12 hours, a point was reached at which the calcium-pectinic acid jelly did not go into complete solution at a pH value of 1.0 or less (but above 0.7). We surmise that at this point the calcium content of the pectinic acid jelly may be dissolved but that the pectinic acid itself has reached a stage where it no longer is soluble in an acid medium at a pH above 0.7. The term "pH required for dissolution of the calcium-pectinic acid jelly" is used herein to include the pH of 1.0 or less (but above 0.7) when complete dissolution is not effected due to far-reaching pectase action, and should be interpreted accordingly.

Another method, and one preferred by us, for following the progress of the pectase action in a plant batch is illustrated by the following example:

Twenty grams precipitated chalk are stirred into 1 gallon of an aqueous pectin concentrate containing from 37 to 40 jelly grade units per gallon (approximately a 3:1 or 4:1 concentration of a pectin extract prepared from lemon pulp). The resulting chalk suspension has a pH value 5.5 and is maintained at a temperature of about 100° F.

A pectase infusion is prepared by grinding and allowing 1 pound of alfalfa (dried in 12 hours or less at below 130° F. in air containing moisture to an extent of less than 30% of saturation) to stand at 100° F. in 1 gallon of water for ½ hour and squeezing out the resulting infusion through a fine cloth. The infusion has a pH of from 6.0 to 6.5.

500 cc. of the pectase infusion are thoroughly incorporated with the pectin concentrate containing the suspended chalk, and the test described hereinbelow is carried out at ½ hour intervals.

Approximately 600 gram samples taken from the jelly formed by the pectase action are passed through a potato ricer having holes about 1/20 inch in diameter. Concentrated hydrochloric acid is added to the disintegrated jelly and the resulting mixture is stirred to bring about solution if possible. The amount of hydrochloric acid added is regulated so as to effect a pH of 1.0 in the mixture. Ordinarily about 15 cc. concentrated hydrochloric acid are required for this purpose.

If solution has been brought about, a 5% sodium acetate solution is gradually added to the pectin solution until jelly formation is effected, and the pH value at this point is determined. This pH value furnishes a measurement of the solubility, in media of various acidities, of the calcium jelly of the treated pectin and indicates the calcium susceptibility of the pectin.

An indication of the amount of 5% sodium acetate required to effect various pH values in a 600 gram sample of pectin concentrate treated for 1/2 hour, brought to a pH of 1.0 with concentrated hydrochloric acid and then subdivided into portions of 4 fluid ounces each, is given in the following table:

4 fluid oz.+18 cc. Na Ac solution—pH=2.00
4 fluid oz.+22 cc. Na Ac solution—pH=2.50
4 fluid oz.+28 cc. Na Ac solution—pH=3.00
4 fluid oz.+33 cc. Na Ac solution—pH=3.50

The results obtained by testing as disclosed hereinabove at 1/2 hour intervals are tabulated as follows:

extent of pectase action and correspond to pectinic acids having definite combinations of calcium susceptibilities with jellying characteristics which can be easily ascertained by immediately after or better, concurrently with the testing, terminating the pectase action, isolating the resulting pectinic acid, and determining its jellying and other characteristics. Both the pH required for dissolution of the calcium-pectinic acid jelly and the pH of calcium jelly formation are measures of the calcium susceptibility of a pectinic acid and are correlated with the amount of soluble calcium required for precipitation of a pectinic acid which, as disclosed in said copending application, decreases with progressive pectase action.

Thus, we measure the calcium susceptibility of a pectinic acid by determining, in the presence of a calcium compound, the pH values of solubility of the combination between said pectinic acid and said calcium. For this purpose, when starting with a gelatinous combination of pectinic acid and calcium not dispersible in water, we may approach the pH of solubility either from above or from below. In the first case, we gradually lower the pH of an aqueous medium in which said calcium-pectinic acid jelly is suspended until dissolution takes place. In the other case, we dissolve a calcium-pectinic acid jelly in an acid aqueous medium and gradually raise the pH of said medium until precipitation of a calcium-pectinic acid combination occurs. We do not

| Pectase Treating Time | pH Effected by Addition of Hydrochloric Acid, 1.00 | pH Effected by Addition of Sodium Acetate Solution | | | | |
|---|---|---|---|---|---|---|
| | | 1.50 | 2.00 | 2.50 | 3.00 | 3.50 |
| 1/2 Hour | Liquid | Liquid | Liquid | Thick Liquid | Weak Set | Set (No Bleeding). |
| 1 Hour | ---do--- | ---do--- | ---do--- | Very Thick Liquid | Set (No Bleeding) | Do. |
| 1 1/2 Hours | ---do--- | ---do--- | ---do--- | Set (Slight Bleeding) | Set (Bleeds) | Set (Bleeds). |
| 2 Hours | ---do--- | ---do--- | ---do--- | Set (No Bleeding) | ---do--- | |
| 2 1/2 Hours | ---do--- | Set | Set (Bleeds) | | | |
| 3 Hours | Ground Mass would not dissolve. | | | | | |

In the preceding table, the term "set" indicates actual jelly formation in which either the whole mass forms one lump of jelly or else smaller jelly particles are formed separated by liquid. The term "bleed" refers to such separating liquid.

Attention is directed to the fact that, as shown by the tabulated data, raising the pH above the value required for jelly formation causes bleeding of the jelly formed at this higher pH value.

The method of testing just disclosed determines the minimum pH value at which a firm non-bleeding jelly is formed in the presence of an excess of calcium chloride. This pH value is slightly above the maximum pH value at which the pectase treated pectin will remain in solution in the presence of dissolved calcium, and is hereafter referred to as the "pH of calcium jelly formation." This value offers another convenient means for determining and designating the calcium susceptibilities of pectinic acids soluble at a pH of 1.0 or higher. It will be noted that the pH of calcium jelly formation drops as pectase action continues until a point is reached where it cannot be determined by the exact steps outlined hereinabove due to the fact that the pectinic acid is no longer dispersible in dilute hydrochloric acid at a pH of 1.0.

Both the pH required for dissolution of the calcium-pectinic acid jelly and the pH of calcium jelly formation are definite measures of the know with any degree of certainty whether the combination of calcium and pectinic acid is due to compound formation or to mutual absorption, but for the purposes of the present invention no answer to that question is required. The presence of sufficient calcium can be assured by carrying out determinations of calcium susceptibility with a combination of calcium and pectinic acid that is not dispersible in water at a pH of 5.3 or higher.

It is, of course, possible to carry out determinations of calcium susceptibility by the methods of the present invention apart from the preparation of such pectinic acid. For that purpose, the pectinic acid may be precipitated by the addition to an aqueous dispersion thereof of calcium, in sufficient amount and in a state of sufficient solubility to effect precipitation with said pectinic acid. The resulting jelly or precipitate may be tested as described hereinabove. It is also possible to add to an aqueous dispersion of the pectinic acid a sufficient amount of calcium chloride, calcium lactate or other water soluble calcium salt to precipitate the pectinic acid and then to vary the pH of the resulting composition until solution takes place and then, if desired, to raise the pH value until precipitation will again occur. In all these tests, acids forming water soluble calcium salts should be employed.

Many details of composition and procedure may be varied within a wide range without departing from the principles of this invention, and it is therefore not our purpose to limit the patent granted on this application otherwise than necessitated by the scope of the appended claims. Rereference is made to our copending application for features not disclosed or discussed in the present application.

We claim as our invention:

1. In the method of demethoxylating pectin by the action of pectase in an aqueous dispersion of pectin having a pH of at least 5.3 maintained by the addition to said dispersion of calcium carbonate to form a series of partially demethoxylated pectinic acids having varying jelly-making properties, the method of determining the progress of the demethoxylation reaction which comprises removing a sample of non-water-dispersible partially demethoxylated pectin containing calcium from the reaction mixture, incrementally incorporating with said sample an acid solution that forms a water-soluble calcium salt, and determining the pH at which dissolution of said sample just takes place, said pH being characteristic of the calcium susceptibility and jelly-making characteristics of said pectinic acid.

2. In the method of demethoxylating pectin by the action of pectase in an aqueous dispersion of pectin having a pH of at least 5.3 maintained by the addition to said dispersion of calcium carbonate to form a series of pectinic acids having varying jelly-making properties, the method of determining the progress of the demethoxylation reaction comprising removing a sample of non-water-dispersible pectinic acids containing calcium from the reaction mixture, incorporating incremental amounts of a mixture of hydrochloric acid and lactic acid with said sample until dissolution of said sample is just effected, and determining the pH at which such dissolution of said sample takes place, said pH being characteristic of the calcium susceptibility and jelly-making characteristics of said pectinic acid.

HERBERT T. LEO.
CLARENCE C. TAYLOR.

REFERENCES CITED

The following references are of record in the file of this patent:

UNITED STATES PATENTS

| Number | Name | Date |
|---|---|---|
| 2,253,389 | Mnookin | Aug. 19, 1941 |
| 2,358,430 | Willaman et al. | Sept. 19, 1944 |
| 2,373,729 | Willaman | Apr. 17, 1945 |

FOREIGN PATENTS

| Number | Country | Date |
|---|---|---|
| 462,028 | Great Britain | Mar. 1, 1937 |

OTHER REFERENCES

Hills et al., 1942 Proceedings Institute of Food Technologists.

Baker, "Canning Age," March 1942, pp. 209–10.

Baker, Scientific Monthly, January 1935, page 50.

Spencer, Jour. Phys. Chem., vol. 33 (1929), pp. 2013 and 2014.

Carre et al., Biochem. Jour., vol 16, No. 1 (1922), page 62.